United States Patent
Murray

(10) Patent No.: US 7,168,521 B1
(45) Date of Patent: Jan. 30, 2007

(54) TREE STAND LADDER HITCH ASSEMBLY

(76) Inventor: David Murray, 1325 E. Weymouth Rd., Vineland, NJ (US) 08360

(*) Notice: Subject to any disclaimer, the term of this patent is extended or adjusted under 35 U.S.C. 154(b) by 196 days.

(21) Appl. No.: 10/934,262

(22) Filed: Sep. 3, 2004

(51) Int. Cl.
    *E06C 5/00* (2006.01)
(52) U.S. Cl. ............. 182/127; 182/116; 182/68.1
(58) Field of Classification Search ........ 182/127, 182/116, 68.1, 194
    See application file for complete search history.

(56) References Cited

U.S. PATENT DOCUMENTS

| | | | |
|---|---|---|---|
| 2,499,091 A * | 2/1950 | Brubaker | 182/127 |
| 2,586,531 A * | 2/1952 | Gordon | 182/127 |
| 4,744,590 A | 5/1988 | Chesney | |
| 4,800,986 A | 1/1989 | Hayes, III | |
| 5,042,614 A | 8/1991 | Rainey | |
| 5,092,503 A * | 3/1992 | Cocks | 224/519 |
| 5,236,062 A | 8/1993 | Laney | |
| 5,368,127 A | 11/1994 | Phillips | |
| 5,564,524 A * | 10/1996 | Thaggard et al. | 182/116 |
| 5,590,738 A | 1/1997 | Hunt et al. | |
| 5,642,844 A | 7/1997 | Rector | |
| 6,138,991 A | 10/2000 | Myers, Jr. | |
| 6,357,548 B1 * | 3/2002 | Boyd | 182/127 |
| 6,425,510 B1 | 7/2002 | King | |
| 6,550,575 B2 | 4/2003 | Spencer et al. | |
| 6,604,606 B1 | 8/2003 | McDougal et al. | |
| 6,811,180 B1 * | 11/2004 | Molliere | 280/652 |
| 6,820,723 B2 * | 11/2004 | Huber | 182/127 |
| 6,948,732 B2 * | 9/2005 | Amacker | 280/415.1 |
| 2002/0134620 A1 * | 9/2002 | Meyer | 182/127 |
| 2002/0179369 A1 | 12/2002 | Wallace | |
| 2005/0252720 A1 * | 11/2005 | Chant et al. | |

* cited by examiner

*Primary Examiner*—Alvin Chin-Shue
(74) *Attorney, Agent, or Firm*—Norman E. Lehrer

(57) ABSTRACT

A tree stand hitch assembly includes a ladder assembly having a tubular base member and a top section, a platform secured to the top section of the ladder assembly, and a non-pivoting, generally rectangular hitch adapted to be secured to the rear of a vehicle. Ladder assembly may be adjustably secured to the hitch. The orientation of the platform in relation to the top section of the ladder assembly may be adjusted. The ladder assembly may be folded or collapsed when not in use.

6 Claims, 4 Drawing Sheets

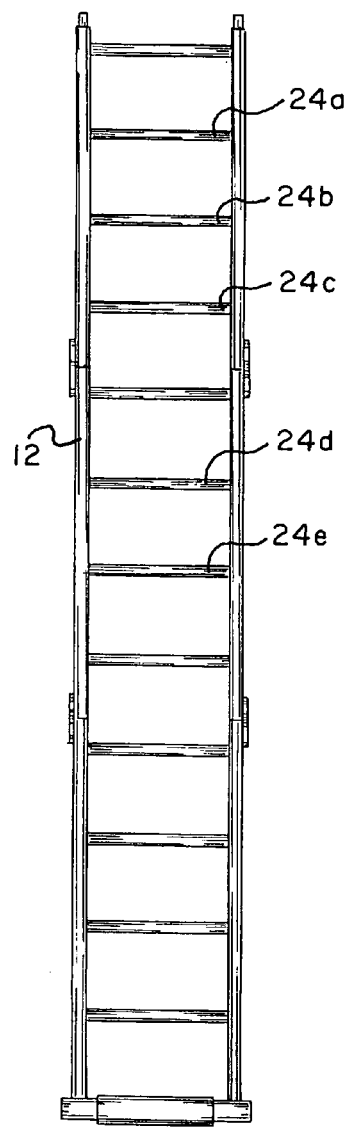
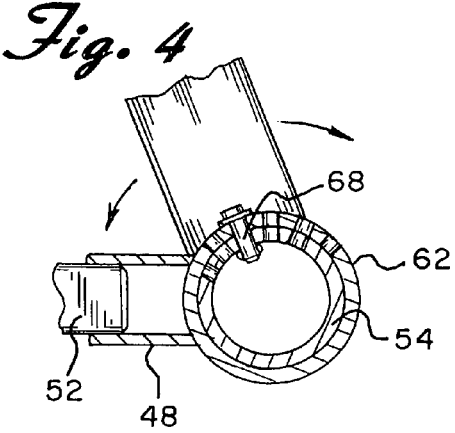
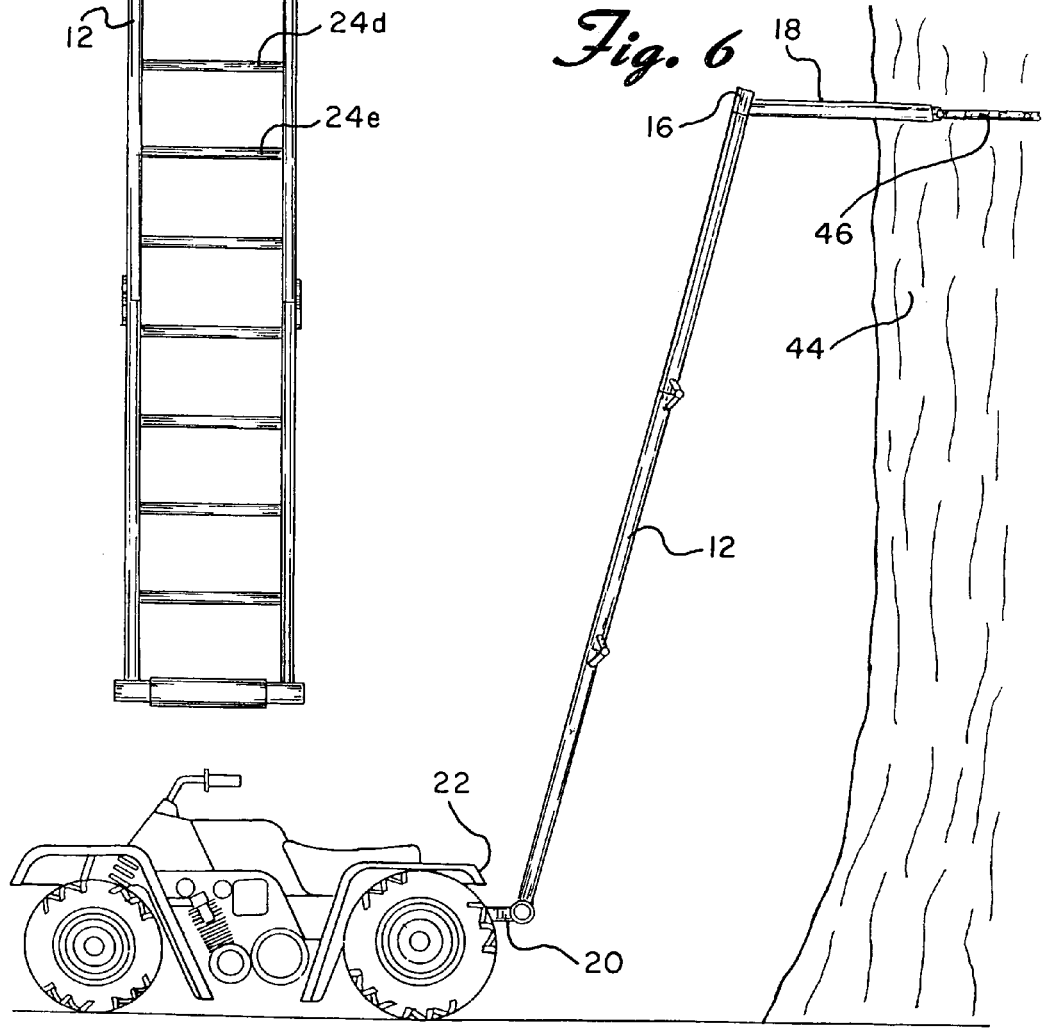

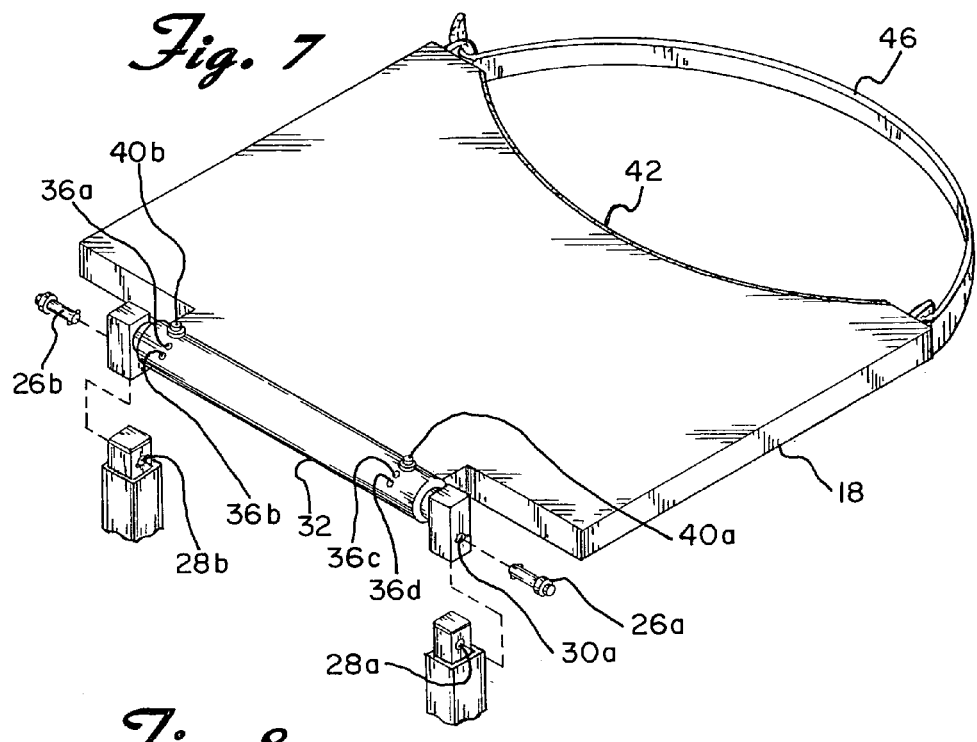
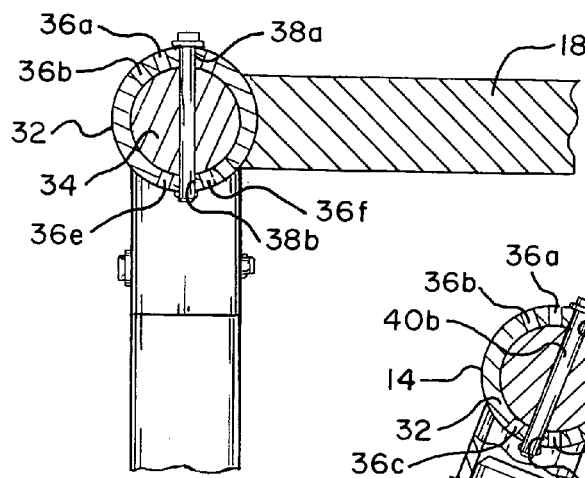
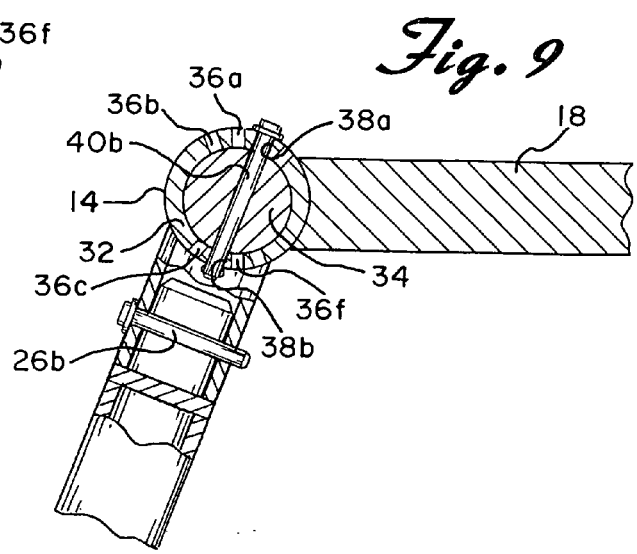

TREE STAND LADDER HITCH ASSEMBLY

BACKGROUND OF THE INVENTION

The present invention is directed toward a hitch for a tree stand ladder and more particularly, toward a tree stand ladder that may be secured to a standard hitch.

Often when hunting or observing game, a hunter finds it advantageous to be located above the ground. In order to achieve this goal, a hunter may sit in a tree. At this elevated position, game may be easily observed without the hunter being detected. Various types of tree stands are known and used by hunters for this purpose.

An example of such a tree stand is described in U.S. Pat. No. 5,590,738 to Hunt et al. This patent discloses a ladder with a platform attached to the top of the ladder. The ladder and platform may be secured to the tree. A problem with such a tree stand, however, is that it becomes burdensome to the hunter to carry such a ladder to a location that may be many miles away from his or her vehicle. Also, the ladder may not be very stable when placed on the ground adjacent the tree.

In order to alleviate the problem of having to carry the ladder, tree stand ladders have been constructed that are easily collapsed and transported by an all terrain vehicle to the desired location. For example, U.S. Pat. No. 5,368,127 to Phillips discloses a compact, portable tree stand that may be carried within a vehicle. However, such a tree stand still may be burdensome to unload and set up.

Several other devices seek to overcome the problems discussed above by using a hitch on a vehicle to load the ladder thereon so that the ladder need only be secured to the tree without having to remove the ladder from the hitch. U.S. Pat. No. 5,642,844 to Rector discloses a tree stand carrier for an all terrain vehicle that is connected to a conventional trailer ball hitch. However, securing a tree stand to such a hitch may be somewhat unstable and may not provide adequate support.

U.S. Pat. No. 5,236,062 to Laney and U.S. Published Patent Application No. 2002/0179369 to Wallace both disclose all terrain vehicles with some type of securing means attached thereto that may be used to secure a tree stand ladder to the vehicle. However, these structures are somewhat specialized and may be complicated to use. Therefore, they are rather impractical.

A need exists for a tree stand ladder hitch assembly that is easy to use, provides stability, and may be secured to a standard hitch.

SUMMARY OF THE INVENTION

The present invention is designed to overcome the deficiencies of the prior art discussed above. It is an object of the present invention to provide a hitch attached to an all terrain vehicle that may be used to secure a tree stand ladder thereto and that is easy to use.

It is another object of the present invention to provide a tree stand ladder hitch assembly where the hitch is a standard hitch.

In accordance with the illustrative embodiments demonstrating features and advantages of the present invention, there is provided a tree stand hitch assembly that essentially includes a ladder assembly having a tubular base member and a top section, a platform secured to the top section of the ladder assembly, a non-pivoting, generally rectangular hitch adapted to be secured to the rear of a vehicle, and means for adjustably securing the ladder assembly to the hitch. The tree stand ladder hitch assembly also includes means for adjusting the orientation of the platform in relation to the top section of the ladder assembly. The ladder assembly may be folded or collapsed when not in use.

Other objects, features, and advantages of the invention will be readily apparent from the following detailed description of the preferred embodiments thereof taken in conjunction with the drawings.

BRIEF DESCRIPTION OF THE DRAWINGS

For the purpose of illustrating the invention, there is shown in the accompanying drawings forms that are presently preferred; it being understood that the invention is not intended to be limited to the precise arrangements and instrumentalities shown.

FIG. 4 illustrates the rotational movement of the support for the ladder of the present invention;

FIG. 5 is a front perspective view of the ladder of the present invention in its extended position;

FIG. 6 illustrates the present invention in use;

FIG. 7 is an exploded view of the attachment of the platform of the present invention to the ladder;

FIG. 8 is a cross-sectional view of the pin assembly between the platform and ladder;

FIG. 9 illustrates the rotational movement of the platform;

DETAILED DESCRIPTION OF THE PREFERRED EMBODIMENTS

Figure 1:
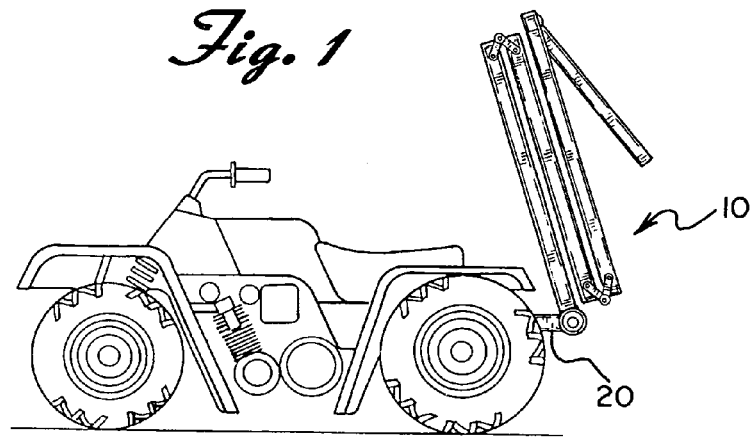
FIG. 1 illustrates the tree stand ladder hitch of the present invention secured to a vehicle.

Referring now to the drawings in detail wherein like reference numerals have been used throughout the various figures to designate like elements, there is shown in FIG. 1 a tree stand ladder hitch constructed in accordance with the principles of the present invention and designated generally as 10.

The tree stand ladder hitch of the present invention essentially includes a ladder assembly 12 having a tubular base member 14 and a top section 16, a platform 18 secured to the top section 16 of the ladder assembly 12, a non-pivoting, generally rectangular hitch 20 adapted to be secured to the rear of a vehicle 22, and means for adjustably securing the ladder assembly to the hitch.

Figure 2:
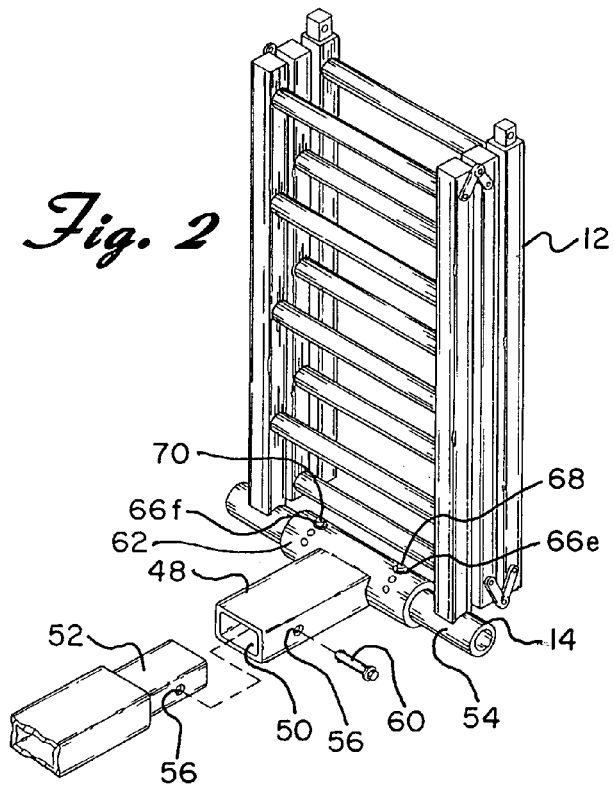
FIG. 2 is a front perspective view of the tree stand ladder hitch of the present invention.

The ladder assembly 12 includes a plurality of rungs 24a–24e, for example, a top section 16 to which the platform 18 is secured, and a tubular base member 14. The platform 18 is secured to the ladder via pins 26a and 26b that are inserted through apertures 28a and 28b that are formed within the top section 16 of the ladder assembly 12 and on the platform 18. (See FIG. 7.) In this embodiment the ladder assembly 12 is folded when not in use. (See FIG. 2.)

The ladder assembly 12 also includes means for adjusting the orientation of the platform 18 in relation to the top section 16 of the ladder assembly 12. The means for adjusting the orientation of the platform 18 includes a tubular member 32 surrounding the top rung 34 of the ladder assembly 12, a plurality of apertures 36a–36f, for example, formed within the tubular member 32, a plurality of apertures, shown as 38a and 38b, formed within the top rung 34 corresponding to the apertures 36a–36f formed in the tubular member 32, and pins 40a and 40b extending through the corresponding apertures in order to secure the platform 18 to the ladder assembly 12. (See FIGS. 8 and 9.)

The platform 18 is generally square. Although other shapes may be used. The platform also has a curved section 42 that fits around the trunk 44 of a tree. (See FIG. 7.) A strap 46 is attached to the platform 18 and extends around the tree trunk 44 so that the platform 18 is secured to the tree. (See FIG. 6.)

Figure 3:
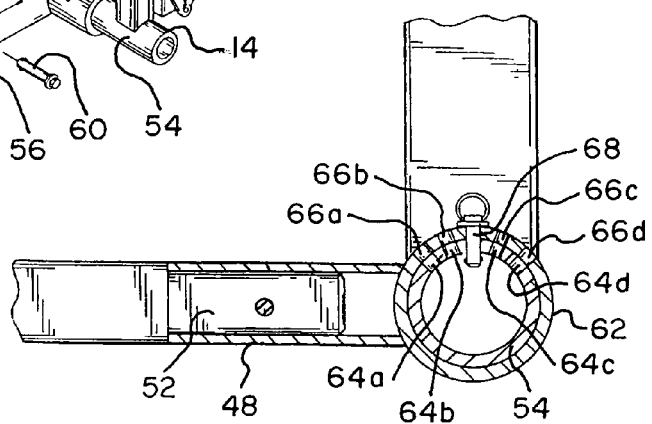
FIG. 3 is a cross-sectional view of the pin assembly of the lower portion of the ladder and hitch of the present invention.

The hitch 20 is comprised essentially of two parts. The first includes a generally elongated rectangular extension 52 that is securely fixed to the vehicle 22. The second part of the hitch is comprised of a hollow, generally rectangular member 48 with a generally rectangular opening 50 that is secured to the base section 54 of the ladder assembly 12. The generally elongated rectangular extension 52 telescopingly fits within the opening 50. An aperture 56 is formed within the generally rectangular member 48, a corresponding aperture 58 is formed within the extension 52, and a pin 60 fits within the apertures 56 and 58 when the apertures 56 and 58 are aligned and secures the rectangular member 48 and the extension together 52. (See FIG. 3.) As should be readily apparent to those skilled in the art, because the interfitting members 48 and 52 are both rectangular, the hitch 20 (in combination with the weight of the vehicle) functions to support the ladder assembly 12 and prevents rotation of the same about the axis of the hitch.

The means for adjusting the angle of the ladder assembly 12 includes a tubular member 62 attached to the hitch 12 and through which the base member 54 of the ladder assembly 12 extends. The base member 54 of the ladder assembly has a plurality of apertures 64a–64d, for example, formed therethrough. The tubular member 62 has a corresponding plurality of apertures 66a–66f, for example, formed therethrough, and pins 68 and 70 that fit within the corresponding apertures of the base member 54 and the tubular member 62 in order to adjustably secure the ladder assembly 12 to the hitch 20.

In order to use the tree stand ladder, the ladder assembly 12 is unfolded and extended. (See FIG. 5.) The ladder assembly remains attached to the hitch 20 and to the vehicle which thereby provides support for the ladder. The angular position of the ladder may be adjusted using the pins 68 and 70 located on the hitch and tubular member as discussed above. (See FIG. 4.) The curved section 42 of the platform 18 is placed against the tree and the strap 46 is secured around the tree. (See FIG. 6.) The placement of the platform 18 against the tree may be adjusted using the pins 40a and 40b located at the top section 16 of the ladder assembly 12.

Figure 10:
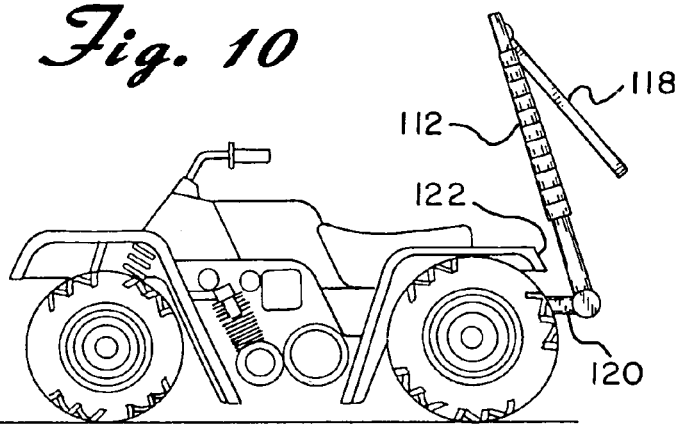
FIG. 10 illustrates a second embodiment of the present invention.
Figure 12:
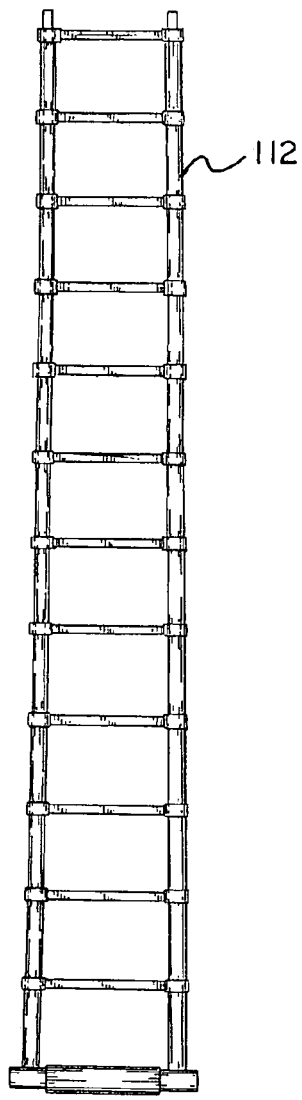
FIG. 12 is a front perspective view of the ladder of the second embodiment in its extended position.
Figure 11:
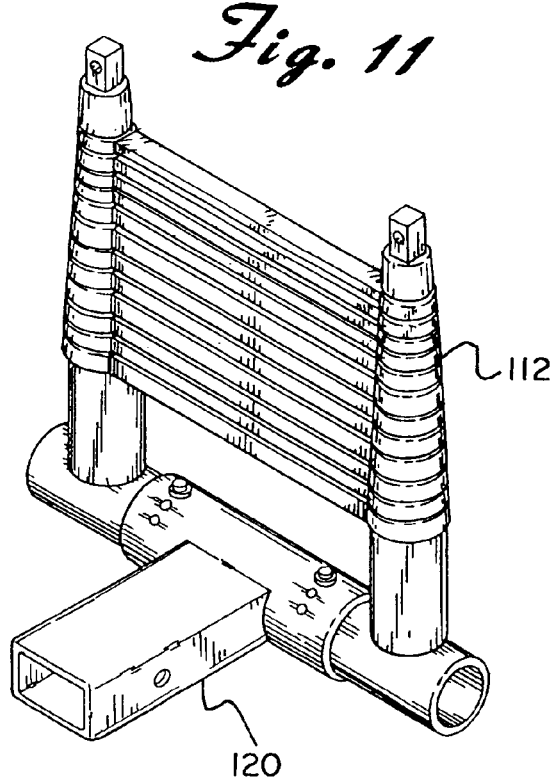
FIG. 11 is a front perspective view of the ladder assembly of the second embodiment in its collapsed condition.

A second embodiment of the present invention is shown in FIGS. 10–12. The tree stand ladder hitch assembly 110 functions in the same manner as described in the first embodiment. However, in this embodiment the ladder assembly 112 is comprised of a plurality of telescoping members that can be extended or collapsed rather than folded as in the first embodiment when the ladder is not in use. (See FIG. 11.) Otherwise, the ladder assembly is secured to the hitch 120 which is secured to the rear end of a vehicle 122 in the same manner and the platform 118 is attached to the ladder assembly 112 in the same manner as in the first embodiment. (See FIG. 10.)

The present invention may be embodied in other specific forms without departing from the spirit or essential attributes thereof and accordingly, reference should be made to the appended claims rather than to the foregoing specification as indicating the scope of the invention.

I claim:

1. A tree stand ladder hitch assembly comprising:
   a ladder assembly having a tubular base member and a top section;
   a platform secured to said top section of said ladder assembly;
   a non-pivoting, generally rectangular hitch adapted to be secured to the rear of a vehicle; and
   means for adjustably securing said ladder assembly to said hitch wherein said means for securing said ladder assembly includes a tubular member attached to said hitch and through which said base member of said ladder assembly extends, said base member of said ladder assembly having a plurality of apertures formed therethrough, said tubular member having a corresponding plurality of apertures formed therethrough, and at least one pin that fits within said corresponding apertures of said base member and said tubular member in order to adjustably secure said ladder assembly to said hitch.

2. The tree stand ladder hitch assembly of claim 1 further including means for adjusting the orientation of said platform in relation to said top section of said ladder assembly.

3. The tree stand ladder hitch assembly of claim 2 wherein said means for adjusting the orientation of said platform includes a tubular member surrounding the top rung of said ladder assembly, a plurality of apertures formed within said tubular member, a plurality of apertures formed within said top rung corresponding to said apertures formed in said tubular member, and at least one pin extending through said corresponding apertures in order to secure said platform to said ladder assembly.

4. The tree stand ladder hitch assembly of claim 1 wherein said ladder assembly is collapsible.

5. The tree stand ladder hitch assembly of claim 1 wherein said ladder assembly is foldable.

6. The tree stand ladder hitch assembly of claim 1 wherein said hitch includes a hollow, generally rectangular member with a generally rectangular opening, a generally elongated rectangular extension telescopingly fitting within said opening and extending outwardly from said base section of said ladder assembly, an aperture formed within said generally rectangular member, a corresponding aperture formed within said extension, and a pin that fits within said apertures when said apertures are aligned and secures said rectangular member and said extension together.

* * * * *